United States Patent
Mukai et al.

(10) Patent No.: US 7,008,705 B2
(45) Date of Patent: Mar. 7, 2006

(54) LAYERED POLYCRYSTALLINE STRUCTURE AND METHOD OF MAKING THE SAME

(75) Inventors: Ryoichi Mukai, Kawasaki (JP); Takuya Uzumaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/812,515

(22) Filed: Mar. 20, 2001

(65) Prior Publication Data

US 2002/0048694 A1    Apr. 25, 2002

(30) Foreign Application Priority Data

Oct. 25, 2000    (JP) .............. 2000-325205

(51) Int. Cl.
   *G11B 5/66*    (2006.01)
   *G11B 5/70*    (2006.01)

(52) U.S. Cl. .................................... 428/830

(58) Field of Classification Search ............ 428/694 T, 428/694 TS, 457, 212, 830
See application file for complete search history.

(56) References Cited

U.S. PATENT DOCUMENTS

| | | | | |
|---|---|---|---|---|
| 5,580,667 A | * | 12/1996 | Lal et al. ..................... | 428/610 |
| 5,700,593 A | * | 12/1997 | Okumura et al. ....... | 428/694 TS |
| 6,143,388 A | * | 11/2000 | Bian et al. .................. | 428/65.3 |
| 6,150,015 A | * | 11/2000 | Bertero et al. .............. | 428/332 |
| 6,171,676 B1 | | 1/2001 | Mukai et al. ............... | 428/65.3 |
| 6,197,367 B1 | | 3/2001 | Matsuda et al. ............ | 427/127 |

FOREIGN PATENT DOCUMENTS

| | | |
|---|---|---|
| JP | 59-038929 | 3/1984 |
| JP | 63-149824 | 6/1988 |
| JP | 64-079918 | 3/1989 |
| JP | 10-143865 | 5/1998 |
| JP | 10-334444 | 12/1998 |

* cited by examiner

*Primary Examiner*—Holly Rickman
(74) *Attorney, Agent, or Firm*—Greer, Burns & Crain, Ltd.

(57) ABSTRACT

A layered polycrystalline structure includes a seed crystal or Cr layer containing non-magnetic Cr atoms. A non-magnetic crystal layer such as a $Co_{65}Cr_{35}$ layer is formed on the exposed surface of the seed crystal layer. A magnetic crystal layer such as a $co_{88}Pt_{12}$ layer is formed on the exposed surface of the non-magnetic crystal layer. Heat treatment induces the diffusion of the Cr atoms along the grain boundaries within the magnetic crystal layer. Walls of a non-magnetic material can be established along the grain boundaries in the magnetic crystal layer. The diffusion of the Cr atoms can sufficiently be suppressed within the lattices of the magnetic crystal grains. Generation of an incomplete non-magnetic region can thus be restrained to the utmost within the magnetic crystal layer. Noise can be reduced in reproduction of a magnetic information data.

11 Claims, 13 Drawing Sheets

LAYERED POLYCRYSTALLINE STRUCTURE AND METHOD OF MAKING THE SAME

BACKGROUND OF THE INVENTION

1. Field of the Invention

The present invention relates to a layered polycrystalline structure preferably employed in a magnetic recording medium such as a hard disk (HD), for example. In particular, the invention relates to a layered polycrystalline structure comprising a seed crystal layer containing non-magnetic atoms, and a magnetic crystal layer containing non-magnetic atoms diffusing along the grain boundaries growing based on the seed crystal layer, and to a method of making the same.

2. Description of the Prior Art

A magnetic polycrystalline film is generally employed in a magnetic recording medium. The magnetic polycrystalline film includes Cr seed crystal layers formed over the front and rear surfaces of a disk substrate, and Co-based alloy layers or magnetic crystal layers formed based on the epitaxy from the respective Cr seed crystal layers. Non-magnetic atoms such as Cr atoms contained in the Cr seed crystal layer are allowed to diffuse along the grain boundaries of the crystal grains formed within the Co-based alloy layer. The diffusion of the Cr atoms enables reduction in the magnetic interaction between the adjacent magnetic crystal grains. The magnetic polycrystalline film of this type enables a reliable reproduction of a magnetic information data without noise.

When the epitaxial Co-based alloy layer on the Cr seed layer is subjected to heat treatment, the Cr atoms are allowed to diffuse along the grain boundaries in the aforementioned manner. At the same time, the Cr atoms are also allowed to diffuse into the lattices of the crystals in the Co-based alloy layer from the Cr seed layer off the grain boundaries. An incomplete non-magnetic region may be established within the Co-based alloy layer along the boundary to the Cr seed layer. Such an incomplete non-magnetic region is supposed to generate noise in reproduction of a magnetic information data.

As generally known, the minimization of magnetic crystal grains within the Co-based alloy layer leads to reduction in noise in reproduction of a magnetic information data. In the case where the Co-based alloy layer is allowed to epitaxially grow on the Cr seed layer, it is impossible to achieve the minimization of the magnetic crystal grains within the Co-based alloy layer unless the crystal grains can be minimized within the Cr seed layer. No specific means are heretofore proposed to simultaneously achieve the minimization of the crystal grains within the Cr seed layer as well as the sufficient diffusion of the Cr atoms along the grain boundaries.

SUMMARY OF THE INVENTION

It is accordingly an object of the present invention to provide a layered polycrystalline structure capable of reducing an incomplete non-magnetic region within a magnetic crystal layer, and a method of making the same. It is another object of the present invention to provide a method of making a layered polycrystalline structure, greatly contributing to minimization of magnetic crystal grains within a magnetic crystal layer.

According to a first aspect of the present invention, there is provided a method of making a layered polycrystalline structure, comprising: forming a non-magnetic crystal layer on a seed crystal layer containing a non-magnetic element at a first concentration level, said non-magnetic crystal layer containing a non-magnetic element at a second concentration level smaller than the first concentration level; forming a magnetic crystal layer on the non-magnetic crystal layer; and subjecting at least the seed crystal layer, the non-magnetic crystal layer and the magnetic crystal layer to heat treatment so as to diffuse the non-magnetic element along a grain boundary within the magnetic crystal layer.

The heat treatment of the method allows atoms of the non-magnetic element to diffuse along the grain boundary within the magnetic crystal layer. The diffusion of the non-magnetic element serves to establish a wall made of a non-magnetic material along the grain boundary. The wall of the non-magnetic material serves to reduce the magnetic interaction between the adjacent magnetic crystal grains in the magnetic crystal layer. Accordingly, the magnetic crystal layer of this type enables a reliable reproduction of a magnetic information data without noise.

Moreover, the non-magnetic crystal layer serves to establish an appropriate concentration gradient of the non-magnetic element between the seed crystal layer and the magnetic crystal layer in the aforementioned method. Such a concentration gradient efficiently contributes to a suppressed diffusion of the non-magnetic element within the lattice of the magnetic crystal grain. Generation of an incomplete non-magnetic region can be avoided to the utmost within the magnetic crystal layer. Accordingly, noise can still further be reduced in reproduction of a magnetic information data.

Here, the second concentration level is preferably set at the minimum level enough to establish the complete non-magnetic property of the non-magnetic crystal layer. This second concentration level serves to rapidly decrease the concentration level of the non-magnetic element within the lattice of the magnetic crystal grain near the area adjacent the bottom of the magnetic crystal layer, namely, the boundary between the magnetic crystal layer and the non-magnetic crystal layer. The thickness or extent of an incomplete non-magnetic region can thus reliably be suppressed along the boundary between the non-magnetic crystal layer and the magnetic crystal layer.

According to a second aspect of the present invention, there is provided a method of making a layered polycrystalline structure, comprising: forming a first magnetic crystal layer on a seed crystal layer containing a non-magnetic element; subjecting at least the seed crystal layer and the first magnetic crystal layer to heat treatment so as to transform the first magnetic crystal layer into a non-magnetic crystal layer; forming a second magnetic crystal layer on the non-magnetic crystal layer; and subjecting at least the seed crystal layer, the non-magnetic crystal layer and the second magnetic crystal layer to heat treatment so as to diffuse a non-magnetic element along a grain boundary within the second magnetic crystal layer.

In the same manner as the aforementioned first aspect, a non-magnetic crystal layer can be formed between the seed crystal layer and the magnetic crystal layer prior to the diffusion of the non-magnetic element in this method. An appropriate concentration gradient of the non-magnetic element can be established between the seed crystal layer and the magnetic crystal layer in the aforementioned manner. Such a concentration gradient efficiently contributes to a suppressed diffusion of the non-magnetic element within the lattice of the magnetic crystal grain. Generation of an incomplete non-magnetic region can thus be avoided to the utmost within the magnetic crystal layer in the aforementioned manner.

According to a third aspect of the present invention, there is provided a method of making a layered polycrystalline structure, comprising: forming a magnetic crystal layer on a seed crystal layer containing a non-magnetic element; subjecting at least the seed crystal layer and the magnetic crystal layer to heat treatment so as to form a non-magnetic crystal layer within the magnetic crystal layer along a boundary to the seed crystal layer based on a diffusion of a non-magnetic element; subjecting at least the seed crystal layer, the non-magnetic crystal layer and the magnetic crystal layer to heat treatment so as to diffuse a non-magnetic element along a grain boundary within the magnetic crystal layer.

In the same manner as the aforementioned second aspect, a non-magnetic crystal layer can be formed between the seed crystal layer and the magnetic crystal layer prior to the diffusion of the non-magnetic element in this method. Accordingly, the diffusion of the non-magnetic element can be suppressed within the lattice of the magnetic crystal grain in the aforementioned manner. Generation of an incomplete non-magnetic region can thus be avoided to the utmost within the magnetic crystal layer in the aforementioned manner.

Here, the non-magnetic crystal layer preferably contains the non-magnetic element at the minimum concentration level enough to establish the complete non-magnetic property of the non-magnetic crystal layer. This concentration level serves to rapidly decrease the concentration level of the non-magnetic element within the lattice of the magnetic crystal grain near the area adjacent the bottom of the magnetic crystal layer, namely, the boundary between the magnetic crystal layer and the non-magnetic crystal layer. The thickness or extent of an incomplete non-magnetic region can reliably be suppressed along the boundary between the non-magnetic crystal layer and the magnetic crystal layer.

Any of the methods may contribute to provision of a layered polycrystalline structure comprising: a seed crystal layer containing a non-magnetic element at a first concentration level; a magnetic crystal layer containing a non-magnetic element diffusing along a grain boundary; and a non-magnetic crystal layer interposed between the seed crystal layer and the magnetic crystal layer, said non-magnetic crystal layer containing a non-magnetic element at a second concentration level smaller than the first concentration level. The layered polycrystalline structure of this type serves to restrain generation of an incomplete non-magnetic region within the magnetic crystal layer to the utmost. Accordingly, noise can reliably be reduced in reproduction of a magnetic information data.

In particular, the layered polycrystalline structure may comprise: a seed crystal layer containing Cr atoms at a first concentration level equal to or larger than 50 at %; a Co-based alloy magnetic crystal layer containing Cr atoms diffusing along a grain boundary; and a Co-based alloy non-magnetic crystal layer interposed between the seed crystal layer and the Co-based alloy magnetic crystal layer, said Co-based alloy non-magnetic crystal layer containing Cr atoms at a second concentration level smaller than the first concentration level. In this case, the seed crystal layer may be a pure Cr layer, for example.

The mentioned layered polycrystalline structure may contribute to provision of a magnetic recording medium comprising: a substrate; a seed crystal layer formed on a surface of the substrate and containing a non-magnetic element at a first concentration level; a magnetic crystal layer containing a non-magnetic element diffusing along a grain boundary; and a non-magnetic crystal layer interposed between the seed crystal layer and the magnetic crystal layer, said non-magnetic crystal layer containing a non-magnetic element at a second concentration level smaller than the first concentration level. The magnetic recording medium of this type enables reduction in noise in reproduction of a magnetic information data out of the magnetic crystal layer in the same manner as described above. The mentioned layered polycrystalline structure greatly contributes to achievement of a still higher density in the magnetic recording medium.

The magnetic recording medium may include an amorphous layer defined along the surface of the substrate. The amorphous layer serves to direct the C-axis or easy magnetization axis of the magnetic crystal layer within a plane parallel to the surface of the magnetic recording medium. Such a horizontal easy magnetization axis regulates the orientation of the magnetization of the magnetic crystal layer within the surface of the magnetic recording medium. The magnetic recording medium suitable for a horizontal recordation can thus be obtained.

Alternatively, the magnetic recording medium may include a Ti layer in place of the aforementioned amorphous layer. The Ti layer serves to direct the C-axis or easy magnetization axis of the magnetic crystal layer in the direction perpendicular to the surface of the magnetic recording medium. Such a vertical easy magnetization axis regulates the orientation of the magnetization of the magnetic crystal layer in the direction vertical to the surface of the magnetic recording medium. The magnetic recording medium suitable for a vertical recordation can thus be obtained.

Furthermore, according to a fourth aspect of the present invention, there is provided a method of making a layered polycrystalline structure, comprising: depositing a metallic material on the surface of a substrate; subjecting the metallic material to heat treatment so as to form metallic islands sparsely existing over the surface of the substrate; and cumulating metallic atoms on the surface of the substrate.

When the metallic material such as a metallic ultrathin film is subjected to the heat treatment on the surface of the substrate, the constitutive metal atoms are allowed to aggregate into nucleation sites or metallic islands sparsely existing over the surface of the substrate at a higher density. When the metallic atoms are cumulated on the surface of the substrate after the nucleation sites have been formed, the cumulated metallic atoms tend to grow into a tiny or smallest crystal grain based on the individual nucleation site. The metallic material may be selected from a group consisting of Cr, CoPt, Co, CoW and Co-based alloy, for example.

The method may further comprise previously exposing the surface of the substrate to an adsorptive gas before the metallic material is deposited. The adsorptive gas spreading over the surface of the substrate is supposed to efficiently restrain the growth of the individual nucleation sites or metallic islands on the surface of the substrate. The minimization of the individual metallic island is promoted. Accordingly, the density of the nucleation sites or metallic islands in a unit area can still be increased.

In this case, any oxidative gas may be employed as the adsorptive gas. The oxidative gas is expected to promote the formation of the nucleation sites or metallic islands. The oxidative gas may be represented by $O_2$ gas, $O_3$ gas, $H_2O$ gas, a mixture gas containing at least one of $O_2$ gas, $O_3$ gas and $H_2O$ gas, and the like. The adsorptive gas can be removed during the aforementioned heat treatment prior to cumulation of the metallic atoms over the surface of the substrate.

It is preferable that the substrate having been subjected to such heat treatment is cooled down after the heat treatment. The cooling treatment effected on the substrate in this manner serves to enhance the signal-to-medium-noise ratio (S/Nm) in the resulting magnetic recording medium.

The method of the fourth aspect is allowed to provide a layered polycrystalline structure comprising: nucleation sites sparsely existing over the surface of a substrate; and a crystal layer covering over the surface of the substrate and containing crystal grains growing from the nucleation sites. When the layered polycrystalline structure of this type is applied to a magnetic recording medium, a so-called transition noise can significantly be reduced between the adjacent recording tracks defined on the magnetic recording medium. The fine and smallest magnetic crystal grains in the magnetic crystal layer are supposed to greatly contribute to arrangement of the recording tracks at a still higher density, in other words, establishment of a higher recording density in the magnetic recording medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
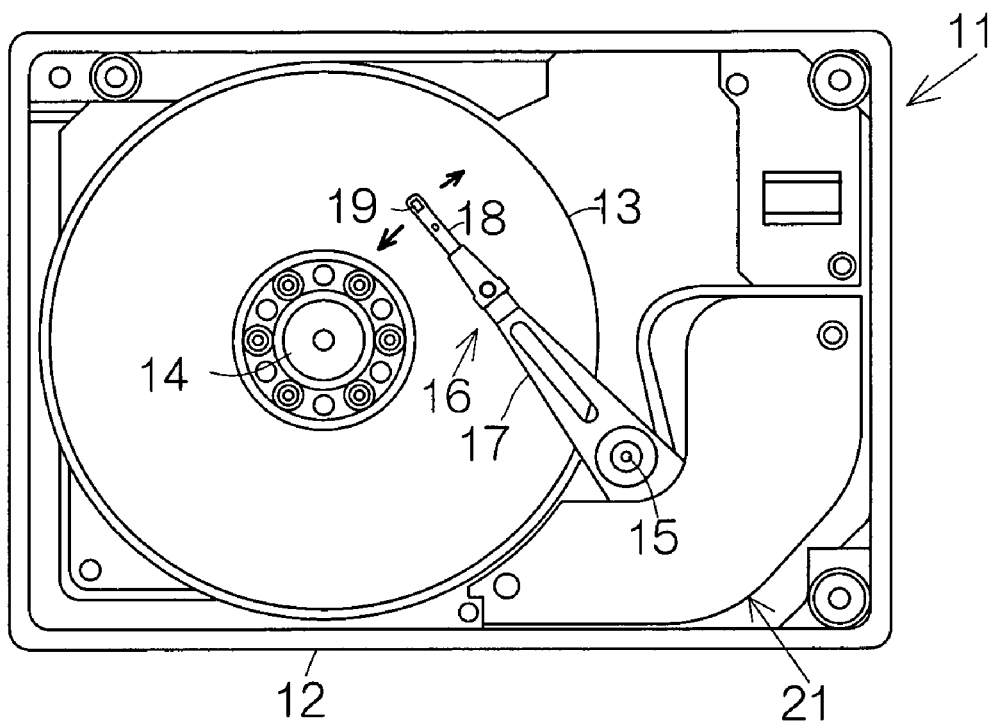
FIG. 1 is a plan view schematically illustrating the structure of a hard disk drive (HDD) as an example of a magnetic recording medium drive.

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during rotation of the magnetic recording disk 13 at a higher stability established by the balance between the lift and the urging force of the head suspension 18.

When the carriage 16 is driven to swing about the support shaft 15 during flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an electromagnetic actuator 21 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspensions 18 are mounted on a single common swinging arm 17 between the adjacent magnetic recording disks 13.

Figure 2:
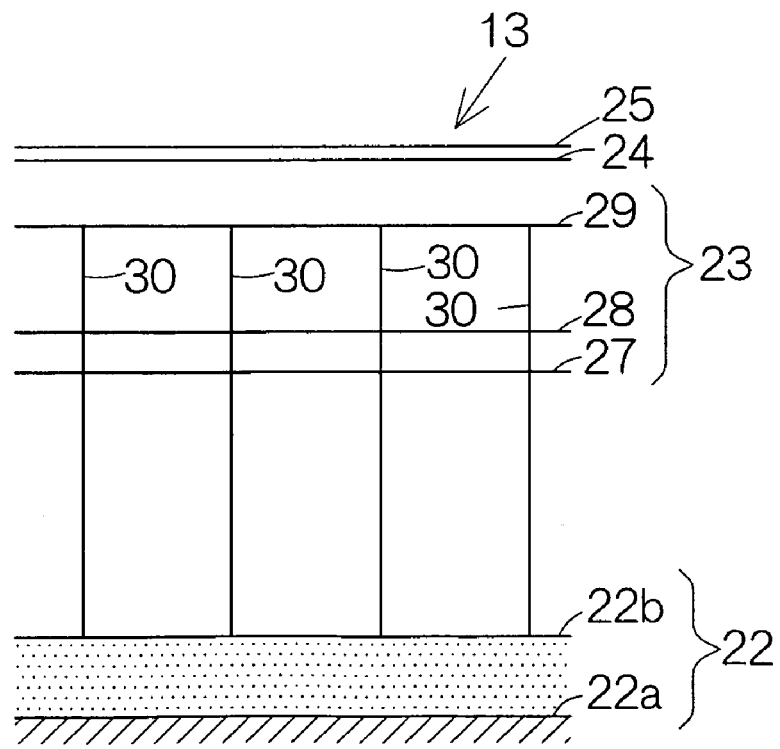
FIG. 2 illustrates an enlarged sectional view of a magnetic recording disk according to a first embodiment of the present invention.

FIG. 2 illustrates in detail the structure of the magnetic recording disk 13 according to a first embodiment of the present invention. The magnetic recording disk 13 includes a substrate 22 as a support member, and layered polycrystalline structure films 23 extending over the front and back surfaces of the substrate 22, respectively. The substrate 22 may comprise a disk-shaped Si body 22a and amorphous $SiO_2$ laminations 22b covering over the front and back surfaces of the Si body 22a, for example. A magnetic information data is recorded in the layered polycrystalline structure films 23. The layered polycrystalline structure film 23 is covered with a carbon protection overcoat 24 and a lubricating agent film 25.

The layered polycrystalline structure film 23 includes a seed crystal layer 27 spreading over the surface of the $SiO_2$ lamination 22b. The seed crystal layer 27 contains non-magnetic atoms at a first concentration level. The seed crystal layer 27 may be made of a pure Cr layer in which the concentration level of the non-magnetic Cr atoms is set at 100 at %. Alternatively, the seed crystal layer 27 may be a Cr-based alloy layer containing non-magnetic Cr atoms at a first concentration level equal to or larger than 50 at %.

A non-magnetic crystal layer 28 is formed to extend over the surface of the seed crystal layer 27. The non-magnetic crystal layer 28 is allowed to have the lattice structure identical to that of the seed crystal layer 27. Specifically, the epitaxial relationship is established between the seed crystal layer 27 and the non-magnetic crystal layer 28. Non-magnetic atoms included in the non-magnetic crystal layer 28 at a second concentration level smaller than the first concentration level serve to establish the non-magnetic property of the non-magnetic crystal layer 28. The second concentration level may be set at a minimum level enough to establish the complete non-magnetic property. For example, when Cr atoms of at least 35 at % are contained within an alloy, a complete non-magnetic property can be established within the alloy.

A magnetic crystal layer 29 is formed to extend over the surface of the non-magnetic crystal layer 28. The magnetic crystal layer 29 is allowed to have the lattice structure identical to those of the seed crystal layer 27 and the non-magnetic crystal layer 28. Specifically, the epitaxial relationship is established between the non-magnetic crystal layer 28 and the magnetic crystal layer 29. The magnetic crystal layer 29 contains non-magnetic atoms diffusing along grain boundaries 30 defined between the adjacent crystal grains. The magnetic crystal layer 29 may be a Co-based alloy layer such as a $Co_{88}Pt_{12}$ layer, for example.

In this Co-based alloy magnetic crystal layer 29, Cr atoms are allowed to diffuse along the grain boundaries 30. The diffusion of the Cr atoms serves to establish walls made of a non-magnetic material along the grain boundaries 30. The non-magnetic material wall reduces the magnetic interaction between the adjacent magnetic crystal grains. Accordingly, noise can be reduced in reproduction of a magnetic information data stored within the magnetic crystal layer 29.

Moreover, the diffusion of the Cr atoms can sufficiently be reduced within the lattice of the magnetic crystal grain along the non-magnetic crystal layer 28 in the Co-based alloy magnetic crystal layer 29. Generation of an incomplete non-magnetic layer or region can be reduced to the utmost within the Co-based alloy magnetic crystal layer 29. Accordingly, noise can further be reduced in reproduction of a magnetic information data.

The Cr seed crystal layer 27 serves to direct the C-axis or easy magnetization axis of the Co-based alloy magnetic crystal layer 29 within a plane parallel to the surface of the magnetic recording disk 13 in this layered polycrystalline structure film 23. Such a horizontal easy magnetization axis regulates the orientation of the magnetization of the Co-based alloy magnetic crystal layer 29 within the surface of the magnetic recording disk 13. Binary data can be defined in accordance with the opposite directions of the magnetization within the surface of the magnetic recording disk 13. The magnetic recording disk 13 suitable for a horizontal recordation can thus be obtained.

Figure 3A:
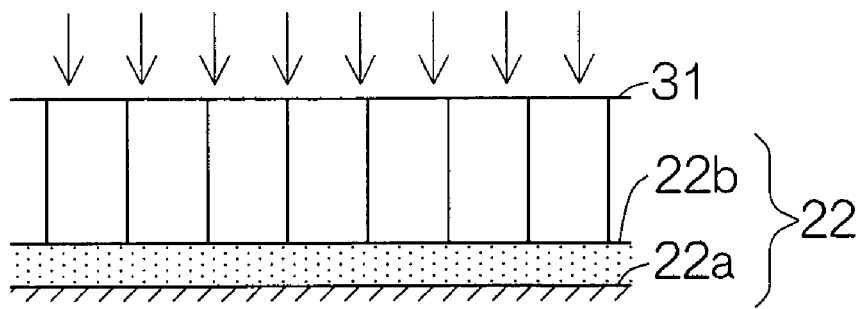
FIGS. 3A to 3C are sectional views of a substrate for schematically illustrating a method of making the magnetic recording disk according to a first specific example.

A detailed description will be made on a method of making the magnetic recording disk 13 according to a first specific example. As shown in FIG. 3A, a disk-shaped substrate 22 is first prepared. The $SiO_2$ lamination 22b is formed to cover over the surface of the Si body 22a in the substrate 22. A Cr layer 31 of approximately 20.0 nm thickness is formed to overlay the surface of the substrate 22. A DC magnetron sputtering apparatus may be employed to form the Cr layer 31, for example. The magnetron sputtering apparatus enables the deposition of Cr atoms over the surface of the substrate 22 in a vacuum chamber. The Cr atoms are expected to grow into crystal grains.

Figure 3B:
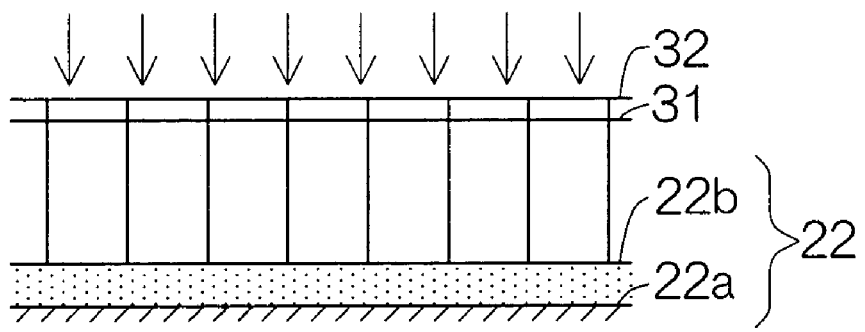

As shown in FIG. 3B, a non-magnetic crystal layer or $Co_{65}Cr_{35}$ layer 32 of approximately 3.0 nm thickness is formed to overlay the exposed surface of the Cr layer 31. The $Co_{65}Cr_{35}$ layer 32 is allowed to include non-magnetic Cr atoms at a second concentration level (=35 at %) lower than the first concentration level (=100 at %). The Cr atoms of the second concentration level serve to completely establish the non-magnetic property of the Co-based alloy. A DC magnetron sputtering apparatus may likewise be employed to form the $Co_{65}Cr_{35}$ layer 32, for example. The magnetron sputtering apparatus enables the deposition of Co and Cr atoms over the surface of the Cr layer 31 in a vacuum chamber. The Co and Cr atoms are expected to grow into crystal grains based on the epitaxy.

Figure 3C:
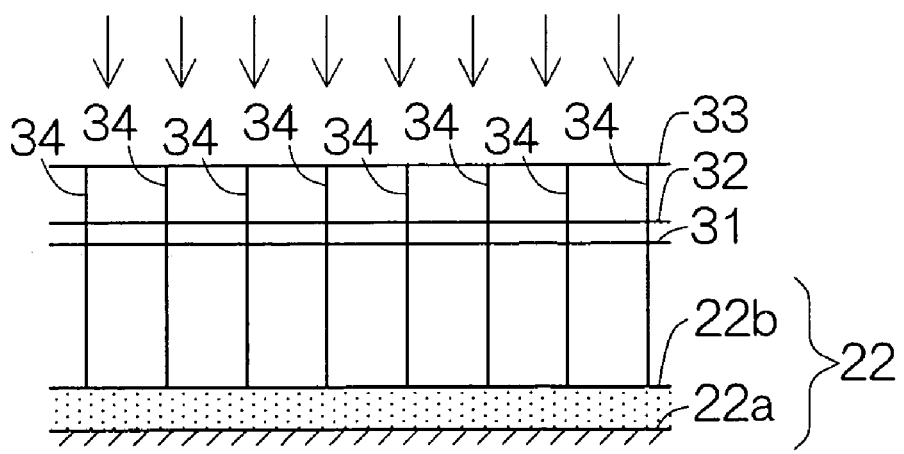

Thereafter, a magnetic crystal layer or $Co_{88}Pt_{12}$ layer 33 of approximately 8.0 nm thickness is formed to overlay the exposed surface of the $Co_{65}Cr_{35}$ layer 32, as shown in FIG. 3C. A DC magnetron sputtering apparatus may likewise be employed to form the $Co_{88}Pt_{12}$ layer 33, for example. The magnetron sputtering apparatus enables the deposition of Co and Pt atoms over the surface of the $Co_{65}Cr_{35}$ layer 32 in a vacuum chamber. The Co and Pt atoms are expected to grow into crystal grains based on the epitaxy. The continuous epitaxy in this manner serves to establish a grain boundary 34 between the adjacent crystal grains within the $Co_{88}Pt_{12}$ layer 33.

Figure 4:
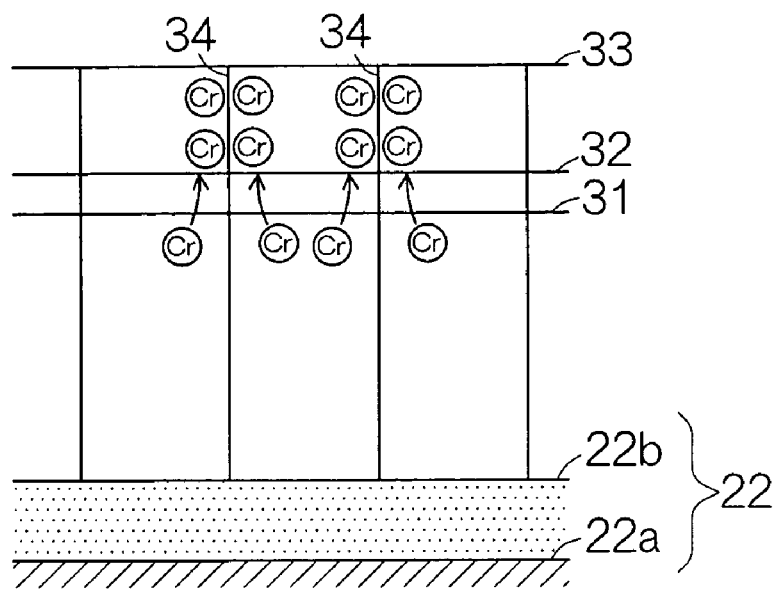
FIG. 4 is a sectional view of the substrate for illustrating diffusion of atoms along grain boundaries in a crystal layer.

After the Cr layer 31, the $Co_{65}Cr_{35}$ layer 32 and the $Co_{88}Pt_{12}$ layer 33 have sequentially been formed on the substrate 22, the substrate 22 is subjected to heat treatment, namely, post-annealing, for duration of 3 min. Heat of approximately 450 degrees Celsius, for example, is effected on the Cr layer 31, the $Co_{65}Cr_{35}$ layer 32 and the $Co_{88}Pt_{12}$ layer 33 in this heat treatment. Under the effect of a higher heat, the Cr atoms within the Cr layer 31 are forced to diffuse along the grain boundaries 34 within the $Co_{65}Cr_{35}$ layer 32 and the $Co_{88}Pt_{12}$ layer 33, as shown in FIG. 4. The diffusion of the Cr atoms serves to establish walls made of a non-magnetic material along the grain boundaries 34. The aforementioned layered polycrystalline structure film 23 can be obtained in this manner. The carbon protection overcoat 24 of approximately 5.0 nm thickness and the lubricating agent film 25 of approximately 1.0 nm thickness, for example, are sequentially formed to spread over the exposed surface of the layered polycrystalline structure film 23.

Figure 5:
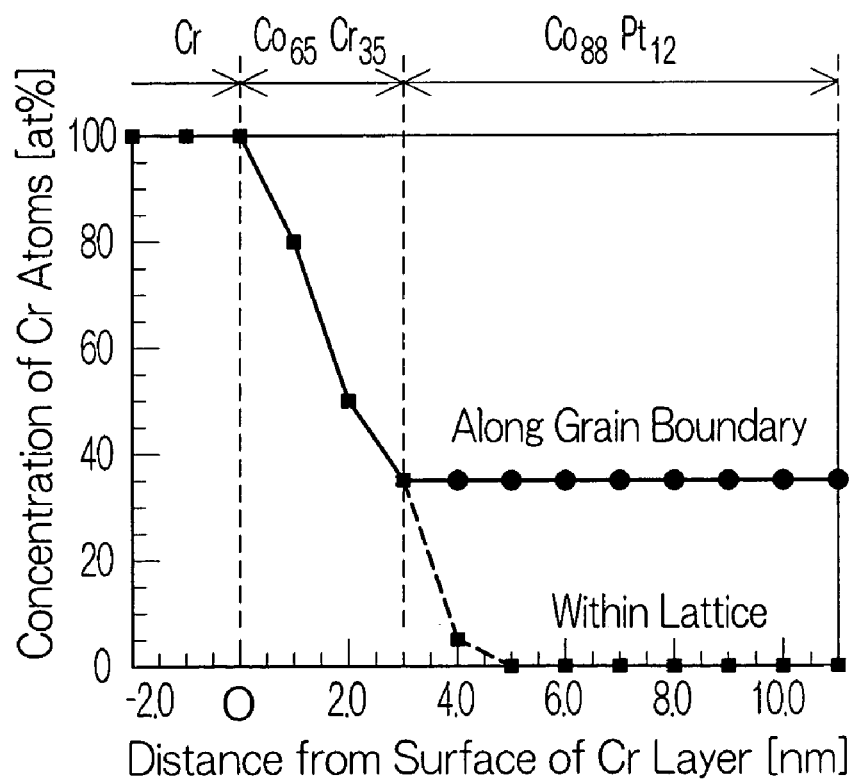
FIG. 5 is a graph illustrating the concentration level of Cr atoms in the magnetic recording disk resulting from the method of the first specific example.

The present inventors have examined the property of the aforementioned layered polycrystalline structure film 23. The distribution or concentration of the Cr atoms has been measured in the layered polycrystalline structure film 23. In measurement, the inventors employed an X-ray energy dispersive spectroscopy (EDS) so as to analyze the concentration of the Cr atoms in the layered polycrystalline structure film 23. The inventors also utilized, in combination with the X-ray EDS, a transmission electron microscope (TEM) so as to observe the section of the layered polycrystalline structure film 23. The measurement has revealed that the diffusion of the Cr atoms at the concentration of 35% has been realized along the grain boundaries 34 within the $Co_{88}Pt_{12}$ layer 33, namely, the magnetic crystal layer 29, as shown in FIG. 5. The non-magnetic walls have been established to extend along the grain boundaries 34. Moreover, the concentration of the Cr atoms has rapidly decreased within the lattices of the magnetic crystals in the $Co_{88}Pt_{12}$ layer 33 near the area adjacent the lower, bottom part of the $Co_{88}Pt_{12}$ layer 33, namely, the boundary between the $Co_{88}Pt_{12}$ layer 33 and the $Co_{65}Cr_{35}$ layer 32 or between the magnetic crystal layer 29 and the non-magnetic crystal layer 28. The thickness of an incomplete non-magnetic region, extending along the boundary between the $Co_{65}Cr_{35}$ layer 32 and the $Co_{88}Pt_{12}$ layer 33, is thus allowed to fall within the range smaller than approximately 1.0 nm from the boundary. The concentration of the Cr atoms in the $Co_{65}Cr_{35}$ layer 32 is allowed to gradually decrease from 100 at % near the boundary to the Cr layer 31, to 35 at %, near the boundary to the $Co_{88}Pt_{12}$ layer 33, and is excluded in the lattices within the upper part of the $Co_{88}Pt_{12}$, layer above the boundary.

Figure 6:
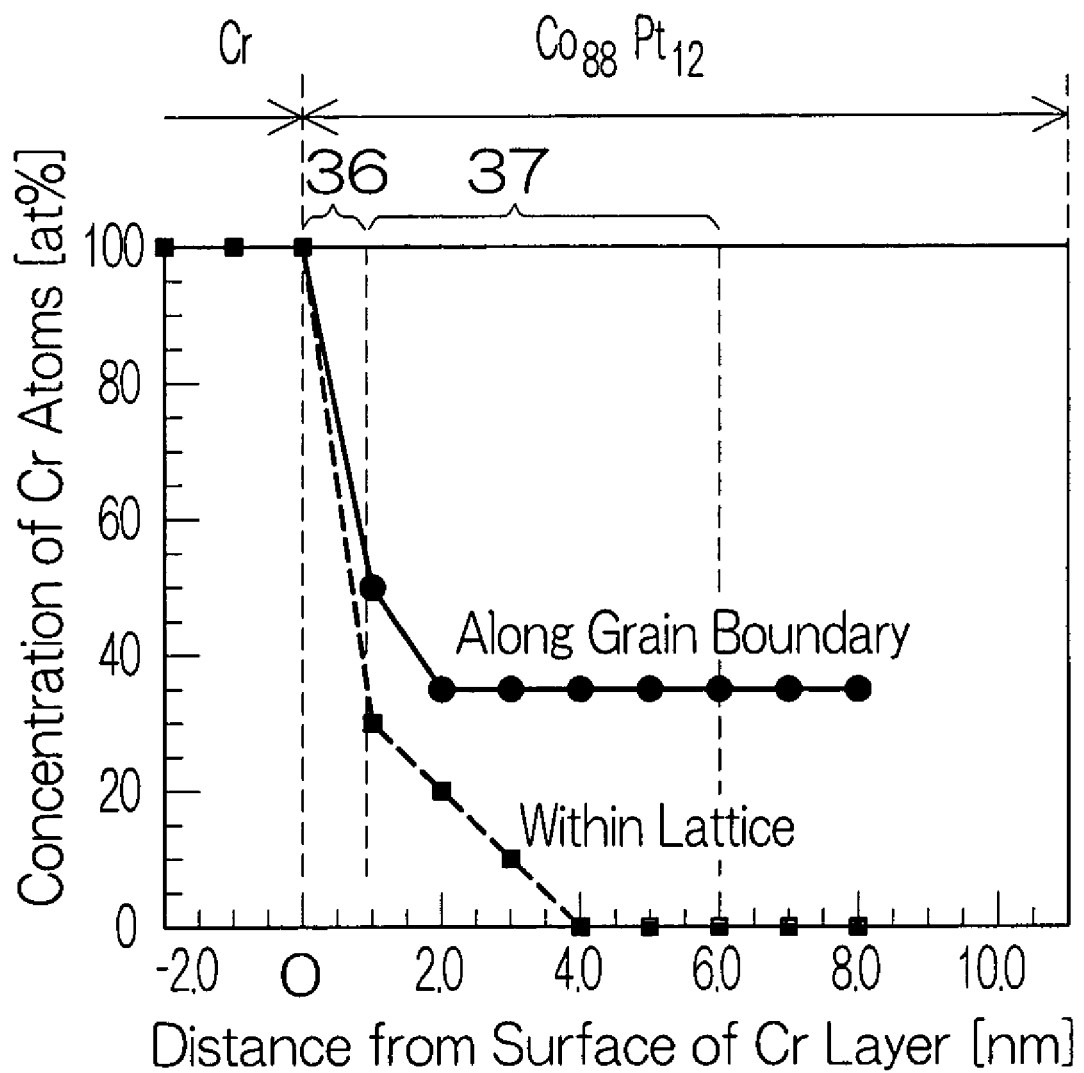
FIG. 6 is a graph illustrating the concentration level of Cr atoms in a magnetic recording disk resulting from a conventional method of making.

FIG. 6 illustrates the distribution or concentration of the Cr atoms in a conventional layered polycrystalline structure. The conventional layered polycrystalline structure was made without formation of the aforementioned $Co_{65}Cr_{35}$ layer. Specifically, the magnetic $Co_{88}Pt_{12}$ layer was formed to extend directly on the surface of the Cr layer. The formed $Co_{88}Pt_{12}$ layer along with the Cr layer was thereafter subjected to heat treatment in the above-described manner. As is apparent from FIG. 6, a complete non-magnetic region 36 was established within the lattices of the crystals in the $Co_{88}Pt_{12}$ layer along the boundary to the Cr layer, while an incomplete non-magnetic layer 37 having the thickness larger than 3.0 nm was also established, adjacent the complete non-magnetic region 36, within the range of 4.0 nm from the boundary to the Cr layer. It has been confirmed that the layered polycrystalline structure film 23 according to the present invention contributes to improvement of the S/N ratio by approximately 3 dB, as compared with the conventional layered polycrystalline structure, when a magnetic information data is read out.

Figure 7A:
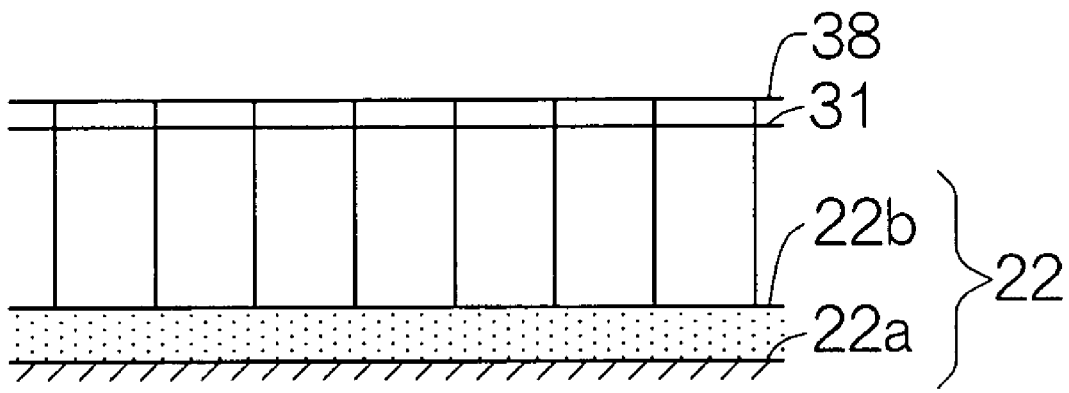
FIGS. 7A and 7B are sectional views of a substrate for schematically illustrating a method of making the magnetic recording disk according to a second specific example.

A method of making according to a second specific example may be employed to form the aforementioned layered polycrystalline structure film 23. In this second specific example, the aforementioned $Co_{65}Cr_{35}$ layer 32 is replaced with a $Co_{88}Pt_{12}$ layer 38 of approximately 3.0 nm thickness, as shown in FIG. 7A, for example. A first magnetic crystal layer or the $Co_{88}Pt_{12}$ layer 38 is formed to overlay the exposed surface of the Cr layer 31. The $Co_{88}Pt_{12}$ layer 38 and the Cr layer 31 are then subjected to a first heat treatment for duration of 1 min. Heat of approximately 500 degrees Celsius, for example, is effected on the $Co_{88}Pt_{12}$ layer 38 and the Cr layer 31 in this first heat treatment. Under the effect of a higher heat, the Cr atoms within the Cr layer 31 are forced to diffuse into the $Co_{88}Pt_{12}$ layer 38. The Cr atoms are allowed to diffuse not only along the grain boundaries but also into the lattices of the crystals off the grain boundaries. The magnetic $Co_{88}Pt_{12}$ layer 38 is transformed into a complete non-magnetic layer. In this case, the concentration of the Cr atoms in the non-magnetic $Co_{88}Pt_{12}$ layer 38 is allowed to gradually decrease from 100 at %, near the boundary to the Cr layer 31, to 35 at %, near the exposed surface, in the same manner as the aforementioned $Co_{65}Cr_{35}$ layer 32 after the heat treatment.

Figure 7B:
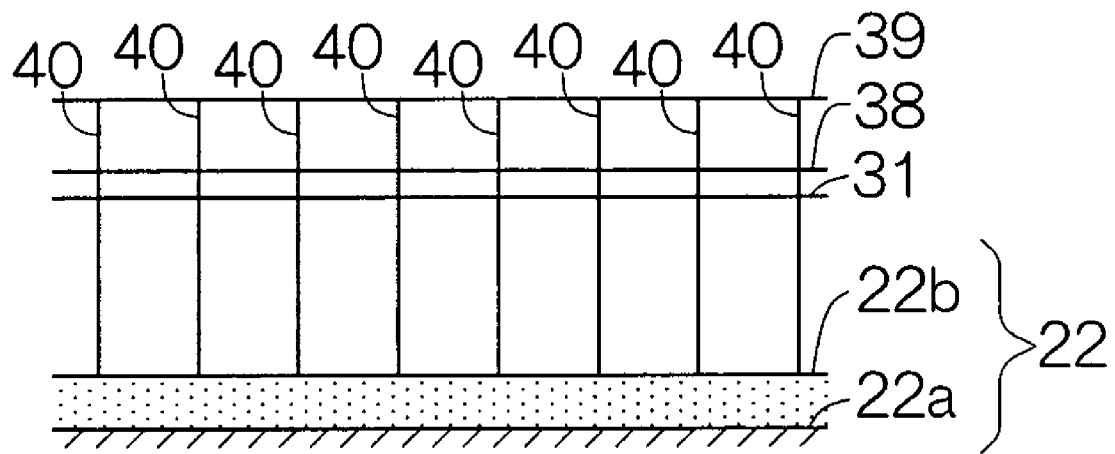

After the first heat treatment has been effected, a second magnetic crystal layer or $Co_{88}Pt_{12}$ layer 39 of approximately 8.0 nm thickness is formed to overlay the exposed surface of the $Co_{88}Pt_{12}$ layer 38, as shown in FIG. 7B, in the same manner as described above. The Cr layer 31, the non-magnetic crystal layer or $Co_{88}Pt_{12}$ layer 38 and the magnetic crystal layer or $Co_{88}Pt_{12}$ layer 39 are thereafter subjected to a second heat treatment, namely, post-annealing, for duration of 3 min. Heat of approximately 450 degrees Celsius, for example, is effected on the Cr layer 31 and the $Co_{88}Pt_{12}$ layers 38, 39 in this second heat treatment. Under the effect of a higher heat, the Cr atoms within the Cr layer 31 are forced to diffuse along the grain boundaries 40 within the magnetic $Co_{88}Pt_{12}$ layer 39 in the manner as described above. Walls made of a non-magnetic material can be established to extend along the grain boundaries 40. The layered polycrystalline structure film 23 formed in the above-mentioned manner enables restriction of an incomplete non-magnetic region, extending within the $Co_{88}Pt_{12}$ layer 39 along the boundary to the $Co_{88}Pt_{12}$ layer 38, within the range smaller than approximately 1.0 nm from the boundary.

Figure 8:
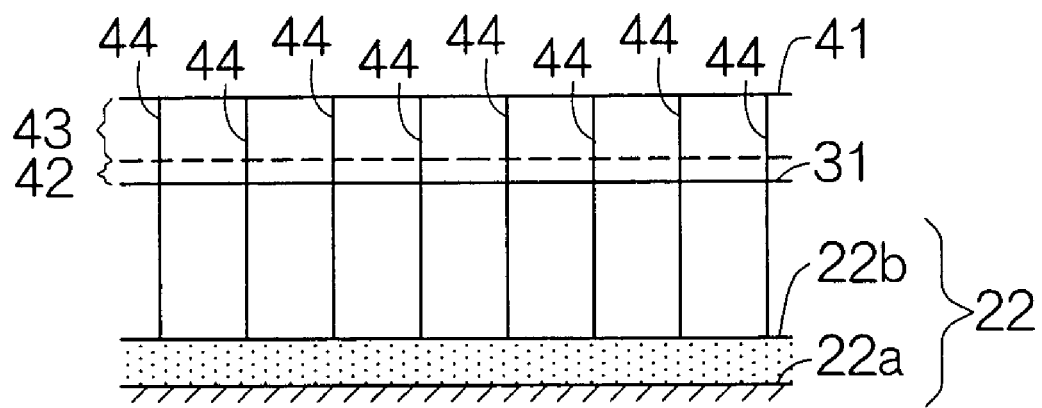
FIG. 8 is a sectional view of a substrate for schematically illustrating a method of making the magnetic recording disk according to a third specific example.

Alternatively, a method of making according to a third specific example may be employed to form the aforementioned layered polycrystalline structure film 23. In this third specific example, a magnetic crystal layer such as a $Co_{88}Pt_{12}$ layer 41 of approximately 11.0 nm thickness is employed in place of the aforementioned $Co_{65}Cr_{35}$ layer 32 and the $Co_{88}Pt_{12}$ layer 33, as shown in FIG. 8, for example. The $Co_{88}Pt_{12}$ layer 41 is formed to overlay the exposed surface of the Cr layer 31. The $Co_{88}Pt_{12}$ layer 41 and the Cr layer 31 are then subjected to a first heat treatment for duration of 1 min. Heat of approximately 500 degrees Celsius, for example, is effected on the $Co_{88}Pt_{12}$ layer 41 and the Cr layer 31 in this first heat treatment. Under the effect of a higher heat, the Cr atoms within the Cr layer 31 are forced to diffuse into the $Co_{88}Pt_{12}$ layer 41. The Cr atoms are allowed to diffuse not only along the grain boundaries but also into the lattices of the crystals off the grain boundaries. A complete non-magnetic region 42, namely, a non-magnetic crystal layer, of approximately 3.0 nm thickness can be formed within the $Co_{88}Pt_{12}$ layer 41 so as to extend along the boundary to the Cr layer 31. In this case, the magnetic region 43 or magnetic crystal layer is still maintained within the $Co_{88}Pt_{12}$ layer 41 between the complete non-magnetic region 42 and the top or exposed surface of the $Co_{88}Pt_{12}$ layer 41. The concentration of the Cr atoms in the complete non-magnetic region 42 is allowed to gradually decrease from 100 at %, near the boundary to the Cr layer 31, to 35 at %, near the boundary to the magnetic region 43, in the same manner as the aforementioned $Co_{65}Cr_{35}$ layer 32 after the heat treatment.

Subsequent to completion of the first heat treatment, the Cr layer 31 and the $Co_{88}Pt_{12}$ layer 41, including the complete non-magnetic region 42 and the magnetic region 43, are subjected to a second heat treatment, namely, post-annealing, for duration of 3 min. Heat of approximately 450 degrees Celsius, for example, is effected on the Cr layer 31 and the $Co_{88}Pt_{12}$ layer 41 in this second heat treatment. Under the effect of a higher heat, the Cr atoms within the Cr layer 31 are forced to diffuse along the grain boundaries 44 within the magnetic region of the $Co_{88}Pt_{12}$ layer 41 in the manner as described above. Wall made of a non-magnetic material can be established to extend along the grain boundaries 44. The layered polycrystalline structure film 23 formed in the above-mentioned manner enables restriction of an incomplete non-magnetic region, extending within the magnetic region 43 of the $Co_{88}Pt_{12}$ layer 41 along the boundary to the complete non-magnetic region 42 in the $Co_{88}Pt_{12}$ layer 41, within the range smaller than approximately 1.0 nm from the boundary.

Figure 9:
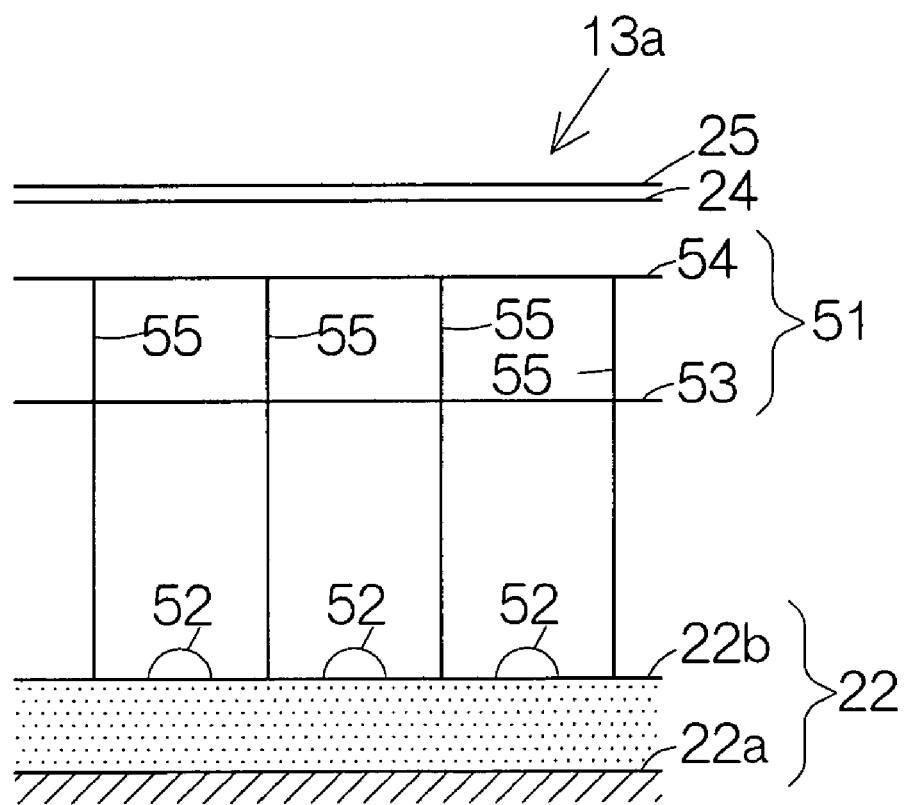
FIG. 9 illustrates an enlarged sectional view of a magnetic recording disk according to a second embodiment of the present invention.

FIG. 9 illustrates in detail the structure of the magnetic recording disk 13a according to a second embodiment of the present invention. A layered polycrystalline structure film 51 includes nucleation sites or metallic islands 52 sparsely existing on the surface of the substrate 22 at a higher density. The nucleation sites 52 may be made of an aggregation of Cr atoms, Co atoms, or atoms of CoPt, CoW, and other Co-based alloys, for example.

A seed crystal layer 53 is formed to extend over the surface of the substrate 22. The nucleation sites 52 are contained within the seed crystal layer 53. Crystal grains are defined within the seed crystal layer 53 for the respective nucleation sites 52. The seed crystal layer 53 may be made of a pure Cr layer, for example.

A magnetic crystal layer 54 is formed to extend over the surface of the seed crystal layer 53. The magnetic crystal layer 54 is allowed to have the lattice structure identical to that of the seed crystal layer 53. Specifically, the epitaxial relationship is established between the seed crystal layer 53 and the magnetic crystal layer 54. The magnetic crystal layer 54 contains non-magnetic Cr atoms diffusing along grain boundaries 55 defined between the adjacent crystal grains in the same manner as described above. The magnetic crystal layer 54 may be a Co-based alloy layer such as a $Co_{90}Pt_{10}$ layer, for example. In this second embodiment, like reference numerals are attached to the structures or components identical to those of the first embodiment. It should be noted that the layered polycrystalline structure film 51 according to the second embodiment may further include a non-magnetic crystal layer, not shown, according to the first embodiment between the seed crystal layer 53 and the magnetic crystal layer 54.

The layered polycrystalline structure film 51 enables establishment of fine and smallest crystal grains within the seed crystal layer 53 and the magnetic crystal layer 54, as described later in detail. The magnetic recording disk 13a employing the layered polycrystalline structure film 51 thus realizes a significant reduction in transition noise between the adjacent recording tracks defined on the surface of the magnetic recording disk 13a. The fine and smallest crystal or magnetic grains in the magnetic crystal layer 54 are supposed to greatly contribute to arrangement of the recording tracks at a still higher density, in other words, establishment of a higher recording density in the magnetic recording disk 13a.

Figure 10A:
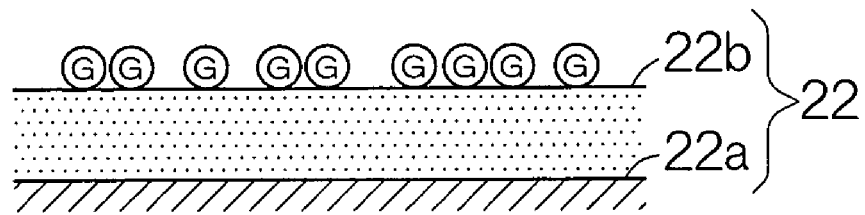
FIGS. 10A to 10C are sectional views of a substrate for schematically illustrating processes of forming a metallic islands on the surface of a substrate according to a fourth specific example of a method of making the magnetic recording disk.

Next, a detailed description will be made on a method of making the magnetic recording disk 13a according to a fourth specific example. A disk-shaped substrate 22 is first prepared in the same manner as described above. The substrate 22 is placed in the normal atmosphere, as shown in FIG. 10A. Molecules or atoms G of an oxidative gas existing in the atmosphere are allowed to adsorb on the surface of the substrate 22, namely, on the exposed surface of the $SiO_2$ lamination 22b. The substrate 22 is then set in a sputtering apparatus.

Figure 10B:
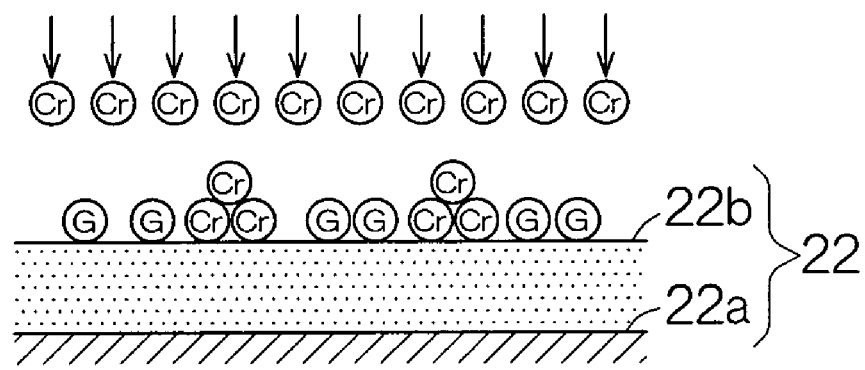

As shown in FIG. 10B, the sputtering apparatus allows the Cr atoms, for example, to fall over the exposed surface of the substrate 22 in the vacuum chamber. The falling Cr atoms are deposited on the surface of the substrate 22 so as to form an ultrathin film of Cr atoms. In the sputtering apparatus, an operation time enough to cumulate the Cr atoms at the thickness of 1.0 nm, for example, should be set to achieve establishment of the ultrathin film. Any material reactive or activated to oxygen can be employed to form the ultrathin film on the surface of the substrate 22. The material may be represented by, in addition to the aforementioned Cr atoms, Co atoms, Pt atoms, Mo atoms, Ni atoms, and the like. In particular, it is preferable to employ a Co—Pt based alloy, including Pt atoms at a concentration level of 10 at %, as a target in the sputtering apparatus. However, the inclusion of the Pt atoms may be allowed to range between 5 at % and 20 at % in the Co—Pt based alloy.

Figure 10C:
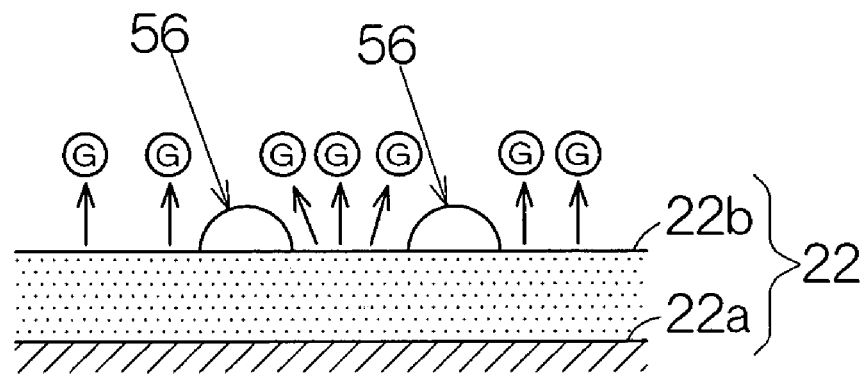

The substrate 22 along with the ultrathin film of the Cr atoms are then subjected to heat treatment. A higher heat serves to induce aggregation of the Cr atoms. The ultrathin film of the Cr atoms is transformed into metallic islands 56 sparsely existing over the surface of the substrate 22, as shown in FIG. 10C. At the same time, the higher heat drives the molecules or atoms G of the oxidative gas away from the surface of the substrate 22. In this case, the molecules or atoms G of the oxidative gas adsorbing on the surface of the substrate 22 serve to restrain the growth of each metallic island 56. The metallic island 56 remains smaller. Accordingly, the density of the metallic islands 56 in a unit area can significantly be increased. The condition of the heat treatment will be described later.

Figure 11:
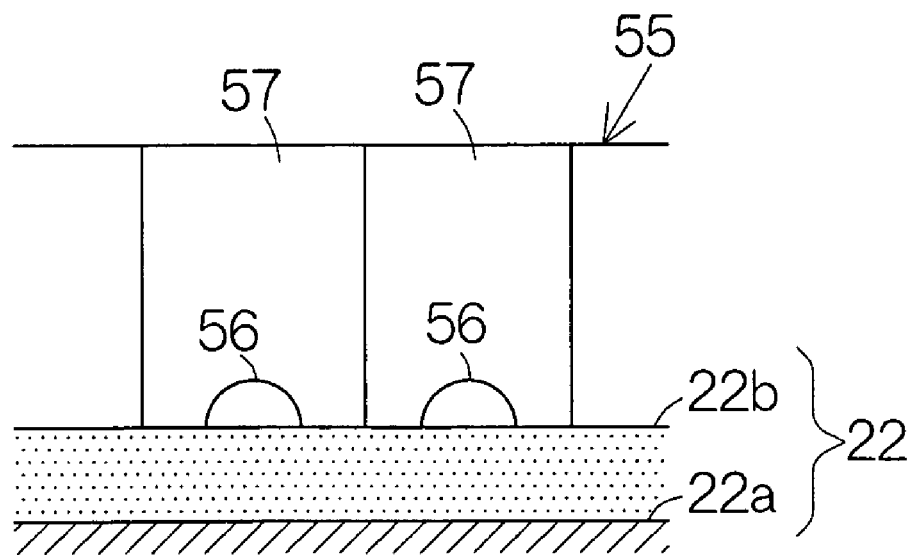
FIG. 11 is a sectional view of the substrate for schematically illustrating the process of forming a seed crystal or Cr layer according to the fourth specific example.

Subsequently, the Cr atoms are forced to fall over the exposed surface of the substrate 22 within the vacuum chamber in the sputtering apparatus, as described above. The Cr atoms cumulate over the exposed surface of the substrate 22. As shown in FIG. 11, the cumulated Cr atoms serve to establish fine and smallest crystal grains 57 growing out of the individual metallic islands 56. In this manner, the seed crystal layer 53, namely, the Cr layer of approximately 18.0 nm thickness, for example, is formed to extend over the surface of the substrate 22.

The magnetic crystal layer 54, namely, the $Co_{90}Pt_{10}$ layer of approximately 7.8 nm thickness, for example, is then formed to spread over the exposed surface of the seed crystal layer 53. A sputtering apparatus may be employed to form the $Co_{90}Pt_{10}$ layer. The Co and Pt atoms are allowed to cumulate on the surface of the Cr layer. The Co and Pt atoms are expected to grow into fine and smallest crystal grains based on the epitaxy. The epitaxial $Co_{90}Pt_{10}$ layer is allowed to establish grain boundaries between the adjacent crystal grains.

Figure 12:
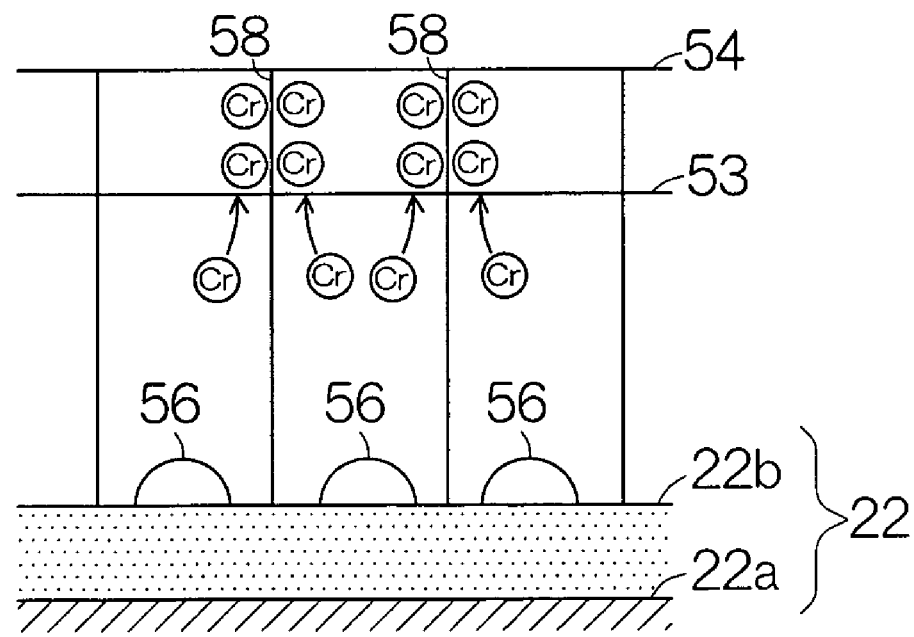
FIG. 12 is a sectional view of the substrate for illustrating diffusion of atoms along grain boundaries in a crystal layer.

After the Cr layer and the $Co_{90}Pt_{10}$ layer have sequentially been formed on the substrate 22, the substrate 22 is subjected to heat treatment, namely, post-annealing, for duration of 3 min. Heat of approximately 350 degrees Celsius, for example, is effected on the Cr layer and the $Co_{90}Pt_{10}$ layer in this heat treatment. Under the effect of a higher heat, the Cr atoms within the seed crystal or Cr layer 53 are forced to diffuse along the grain boundaries 58 within the $Co_{90}Pt_{10}$ layer, as shown in FIG. 12. Since the molecules or atoms G of the oxidative gas have been removed from the exposed surface of the substrate 22, the diffusion of the Cr atoms can easily be promoted without hindrance of the oxidative gas. Walls of non-magnetic material can reliably be established along the grain boundaries. The aforementioned layered polycrystalline structure film 51 is obtained in this manner. The carbon protection overcoat 24 of approximately 5.0 nm thickness and the lubricating agent film 25 of approximately 1.0 nm thickness, for example, are formed to spread over the exposed surface of the layered polycrystalline structure film 51.

Figure 13:
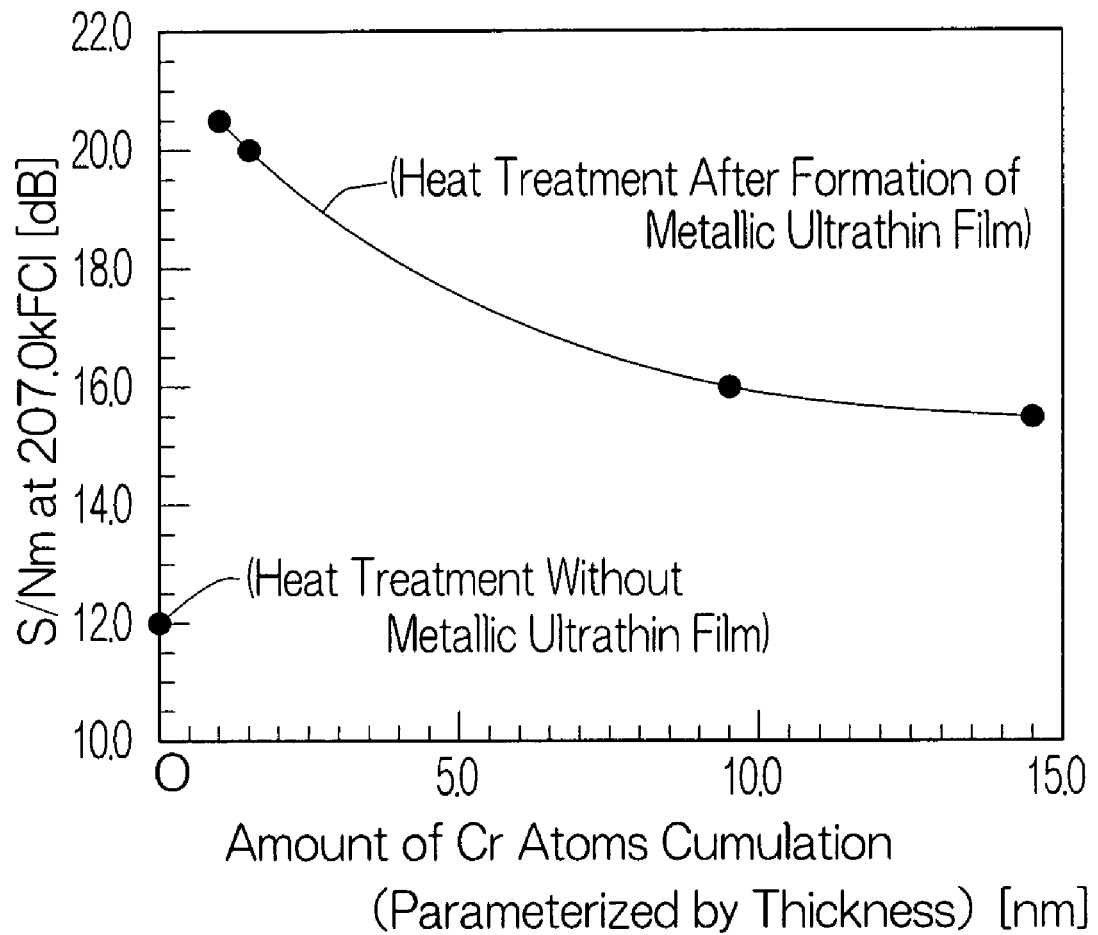
FIG. 13 is a graph illustrating the relationship between the amount of cumulation of Cr atoms and the signal-to-medium-noise ratio (S/Nm) in the magnetic recording disks.

The present inventors have examined the property of the aforementioned layered polycrystalline structure film 51. The signal-to-medium-noise ratio (S/Nm) [dB] has been measured in the magnetic recording disk 13a employing the layered polycrystalline structure film 51. In measurement, the density of the magnetic information data was set at 207.0 kFCI (flux change per inch). When the Cr atoms were allowed to fall for duration or operation time, set to establish cumulation of 1.0 nm thickness, so as to form the ultrathin film resulting in the metallic islands 56, a higher S/Nm of approximately 20.5 dB was achieved, as shown in FIG. 13. An increase in thickness or operation time led to reduction in the S/Nm toward the minimum value of approximately 16.0 dB.

On the other hand, the inventors have also examined a layered polycrystalline structure film according to a specific example in which formation of the aforementioned metallic islands 56 is completely eliminated from the method of making the same. Molecules or atoms of an oxidative gas were removed from the exposed surface of the substrate 22 prior to formation of the seed crystal or Cr layer 53 in this specific example. This specific example exhibited the S/Nm of approximately 12.0 dB. This result has proved that the formation of metallic islands 56 prior to the formation of the Cr layer greatly contributes to improvement in the S/Nm in a magnetic recording disk.

Figure 14:
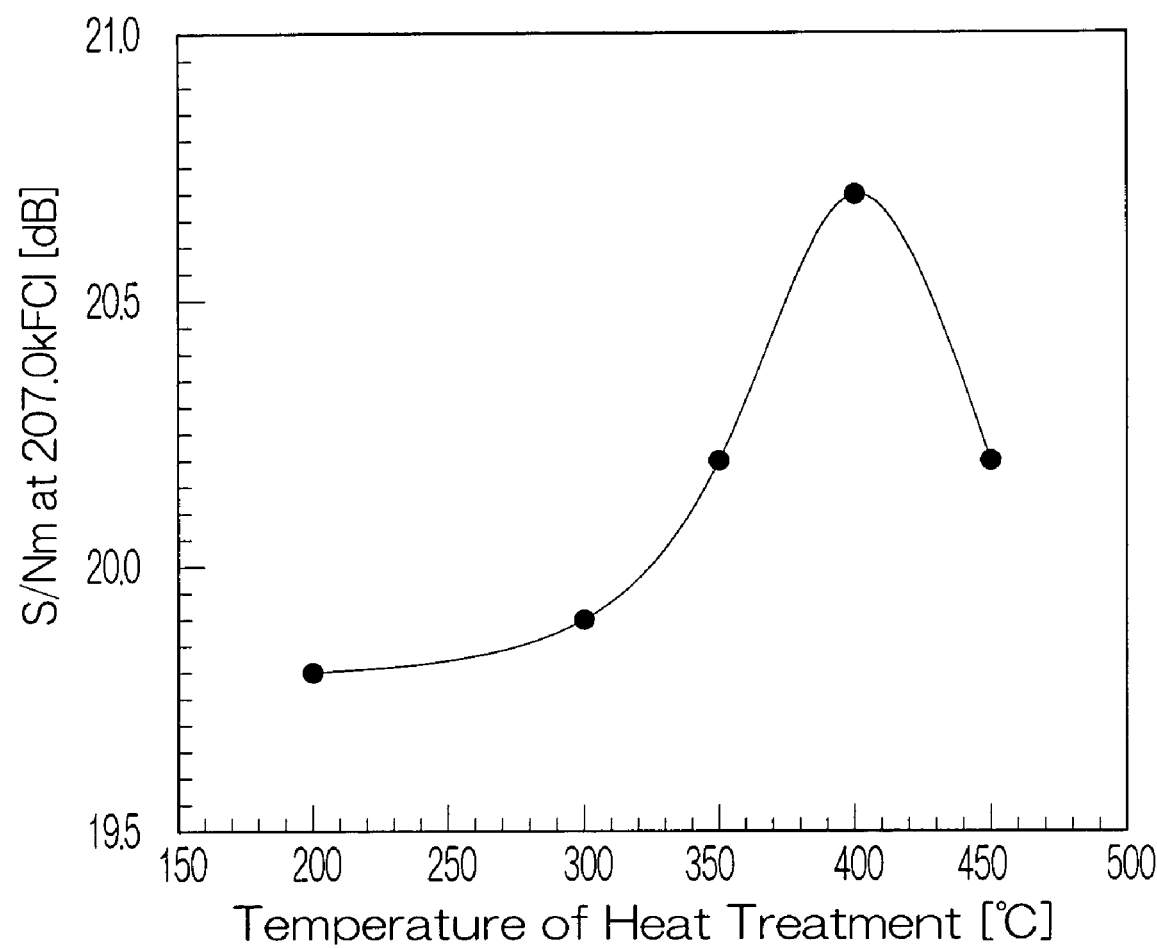
FIG. 14 is a graph illustrating the relationship between the temperature of heat treatment and the S/Nm in the magnetic recording disks.

Next, the inventors have examined the condition, such as temperature, of the heat treatment for establishing the metallic islands 56 and removing the molecules or atoms G of the oxidative gas. The magnetic recording disks 13a were made according to the aforementioned method of making. Different temperatures were set in the heat treatments. The magnetic recording disks 13a were then subjected to measurement of the signal-to-medium-noise ratio (S/Nm) [dB]. In measurement, the density of the magnetic information data was set at 207.0 kFCI in the same manner as described above. As shown in FIG. 14, the highest S/Nm can be achieved if the temperature is set at approximately 400 degrees Celsius. An excessively lower temperature is supposed to lead not only to an insufficient aggregation of the Cr atoms but also to an insufficient removal of the molecules or atoms of the oxidative gas from the exposed surface of the substrate 22 so that the diffusion of the Cr atoms is hindered. The insufficient diffusion of the Cr atoms is supposed to result in a deteriorated S/Nm. On the other hand, a still higher temperature is supposed to lead to an excessive growth of the individual crystal grains in the Cr layer, so that the overgrowth of the crystal grains in the epitaxial magnetic crystal layer is supposed to result in a deteriorated S/Nm.

Figure 15:
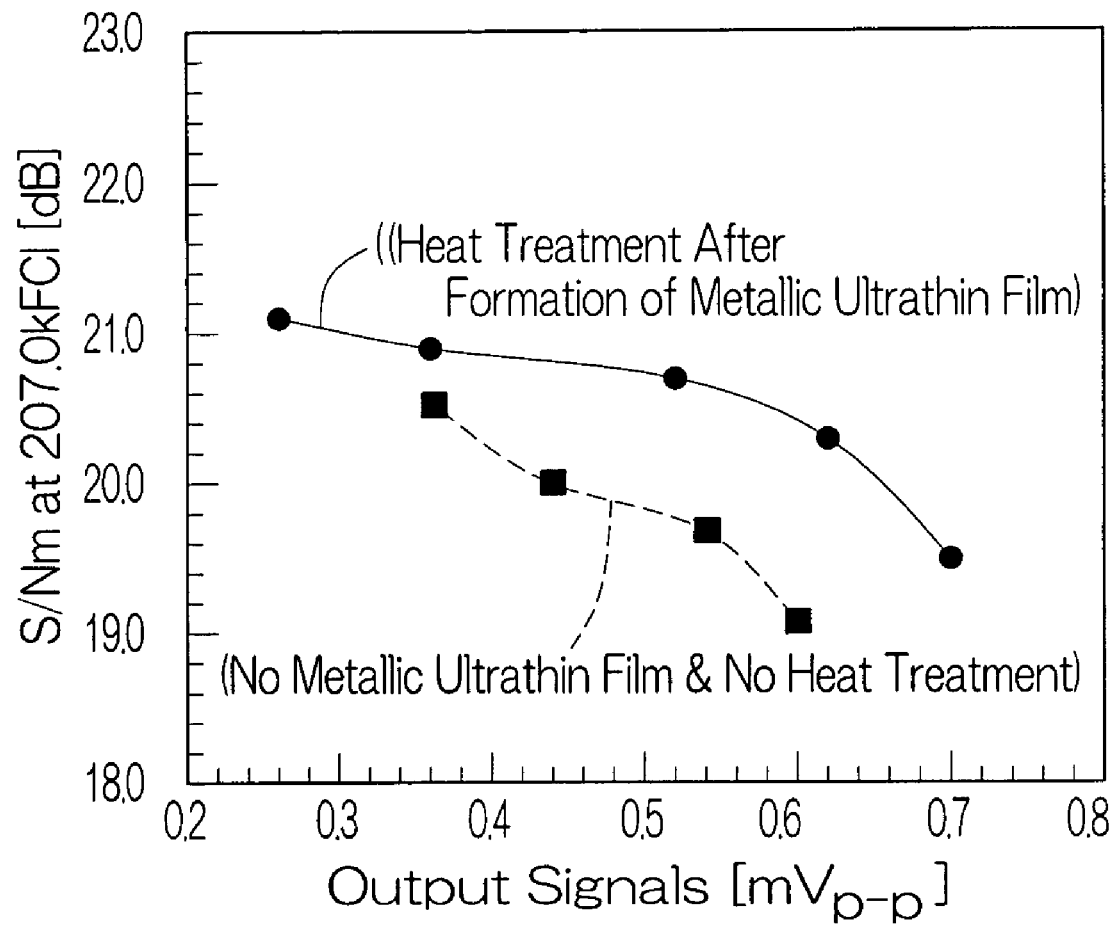
FIG. 15 is a graph illustrating the relationship between the magnitude of the output signals and the S/Nm in the magnetic recording disks.

Further, the inventors have examined the property of the aforementioned layered polycrystalline structure film 51 by comparing it with a layered polycrystalline structure film of another specific example. In this case, the formation of metallic islands 56 and the removal of the oxidative gas were eliminated from the method of making the polycrystalline structure film of the specific example. The signal-to-medium-noise ratio (S/Nm) [dB] was measured in the magnetic recording disks 13a and magnetic recording disks employing the layered polycrystalline structure film of the specific example. A plurality of magnetic recording disks were prepared to have the magnetic crystal or $Co_{90}Pt_{10}$ layers of various thicknesses in the layered polycrystalline structure film 51 and the layered polycrystalline structure film of the specific example. The density of the magnetic information data was set at 207.7 kFCI. As shown in FIG. 15, it has been confirmed that the formation of the metallic islands 56 and the removal of the oxidative gas greatly contribute to improvement in the S/Nm irrespective of the magnitude of output signals.

In the aforementioned method of making according to the fourth specific example, any specific oxidative gas may be introduced into the vacuum chamber of the sputtering apparatus so as to allow the oxidative gas to adsorb on the surface of the substrate 22, in place of employment of the natural oxidative gas existing in the normal atmosphere in the aforementioned manner. In this case, the natural oxidative gas first adsorbing on the exposed surface of the substrate 22 is removed in the vacuum chamber of the sputtering apparatus right after the substrate 22 has been set in the sputtering apparatus. Heat of approximately 400 degrees Celsius may be effected on the substrate 22, for example, so as to remove the oxidative gas. The substrate 22 is thereafter exposed to an $O_2$ gas atmosphere under the pressure of 0.133 Pa, for example. The exposure for duration of 2 min enables establishment of an $O_2$ gas layer of 2L (2 molecules) thickness over the exposed surface of the substrate 22. The metallic islands 56 are allowed to grow on the surface of the $O_2$ gas layer. The oxidative gas may include, in addition to $O_2$ gas, $O_3$ gas, $H_2O$ gas, a mixture gas containing at least one of $O_2$ gas, $O_3$ gas and $H_2O$ gas. The adsorption of the oxidative gas may be effected under a discharge inducing the plasma of the gas, for example.

Figure 16:
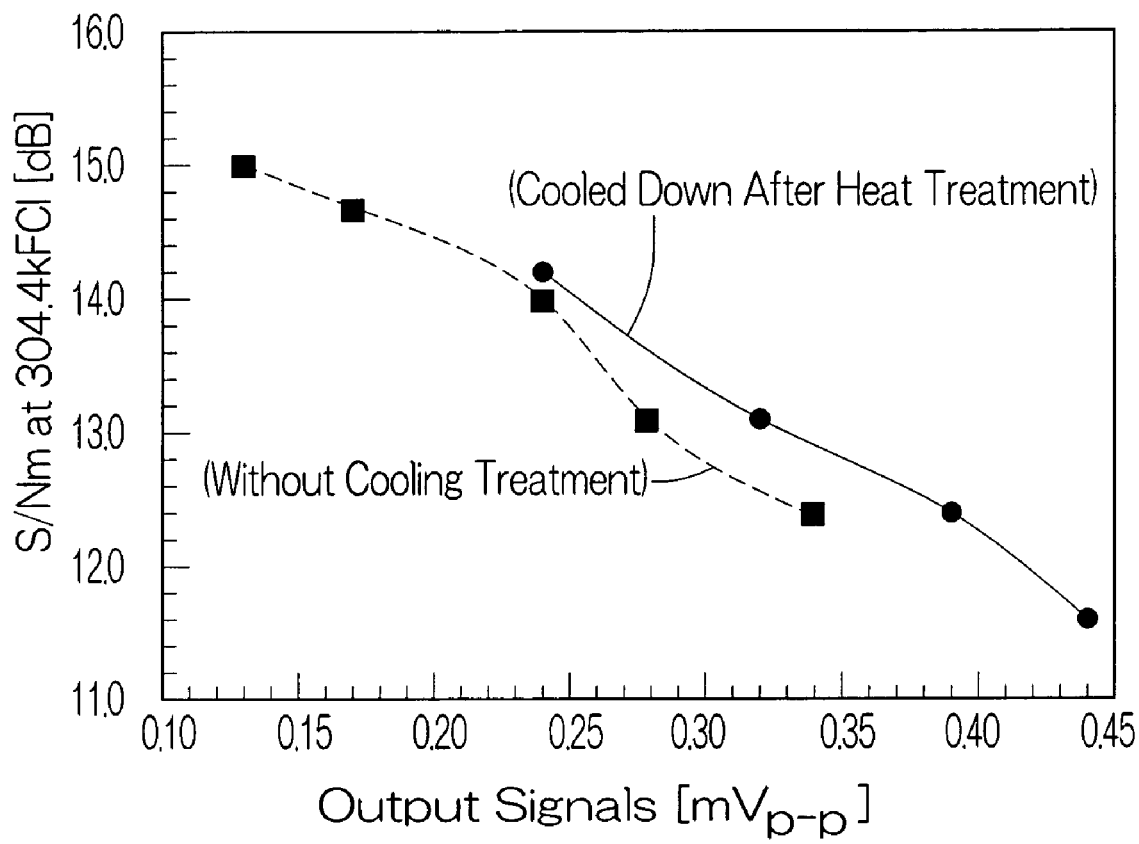
FIG. 16 is a graph illustrating the relationship between the magnitude of the output signals and the S/Nm in the magnetic recording disks.

In the aforementioned method of making according to the fourth specific example, the substrate 22 may be subjected to a cooling treatment after the metallic islands 56 have been formed and the oxidative gas has been removed from the exposed surface of the substrate 22 based on the aforementioned heat treatment. The inventors have examined the effect of such a cooling treatment. In examination, the inventors prepared the layered polycrystalline structure film 51 subjected to a cooling treatment after the heat treatment and the layered polycrystalline structure film 51 subjected to no cooling treatment. The signal-to-medium-noise ratio (S/Nm) [dB] was measured in the magnetic recording disks employing the respective layered polycrystalline structure films 51. The magnetic recording disks were prepared to have the magnetic crystal or $Co_{90}Pt_{10}$ layers of various thicknesses in the layered polycrystalline structure films 51. The density of the magnetic information data was set at 304.4 kFCI. As shown in FIG. 16, it has been confirmed that the cooling treatment after the heat treatment greatly contributes to improvement in the S/Nm irrespective of the magnitude of output signals.

It should be noted that the method of making according to the fourth specific example may employ a reverse sputtering utilizing an inert gas, in place of the aforementioned heat treatment, so as to remove the oxidative gas from the exposed surface of the substrate 22. Such an inert gas may be represented by Ar, Ne, Xe, and the like, for example.

Figure 17:
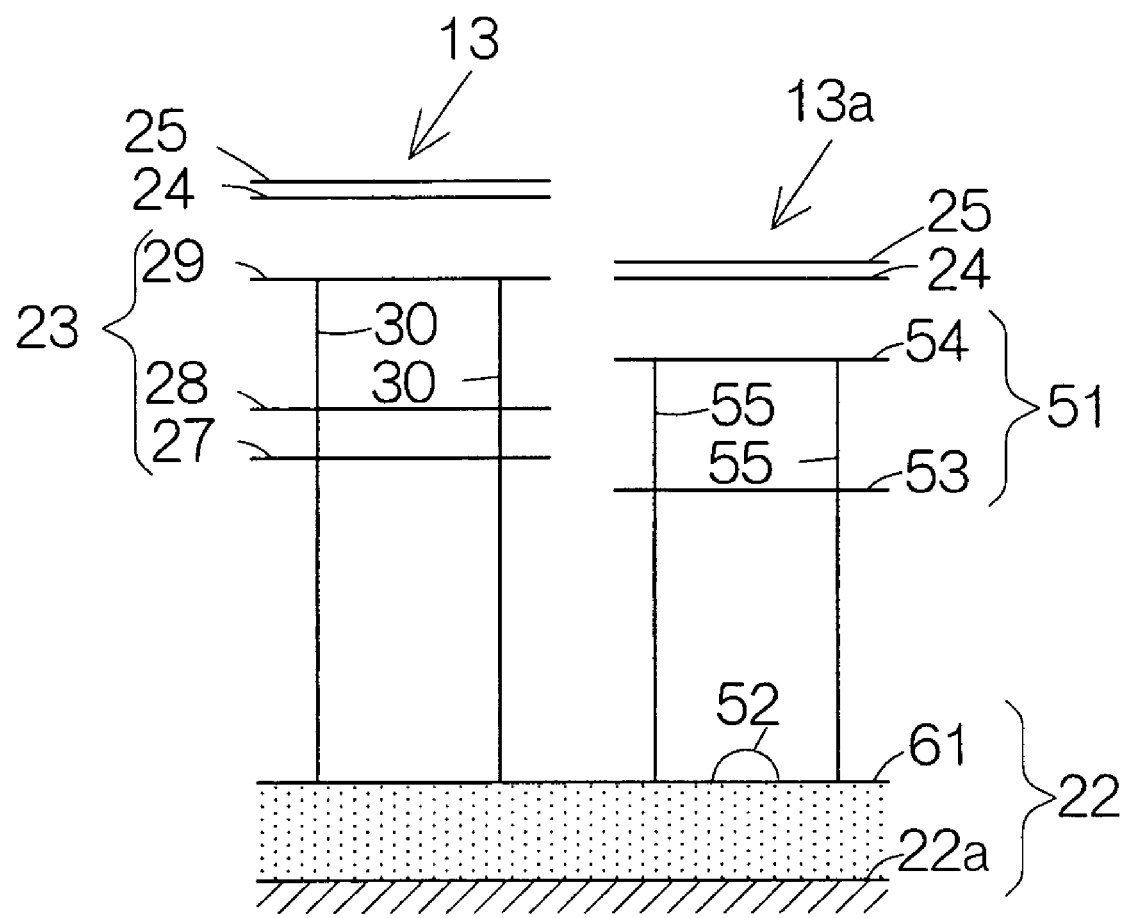
FIG. 17 illustrates sectional views of magnetic recording disks according to the modifications of the first and second embodiments, respectively.

Additionally, Ti layers 61 may be formed to extend over the front and back surfaces of the substrates 22 in the magnetic recording disks 13, 13a, as shown in FIG. 17, for example. The seed crystal layers 27, 53 are formed to overlay the surface of the Ti layers 61, respectively. The Ti layer 61 serves to direct the C-axis or easy magnetization axis of the Co-based alloy magnetic crystal layer 29, 54 in a direction vertical to the surface of the magnetic recording disk 13, 13a. Such a vertical easy magnetization axis regulates the orientation of the magnetization of the Co-based alloy magnetic crystal layer 29, 54 in the direction vertical to the surface of the magnetic recording disk 13, 13a. Binary data can be defined in accordance with the opposite directions of the magnetization in the direction vertical to the surface of the magnetic recording disk 13, 13a. The magnetic recording disk 13, 13a suitable for a vertical recording can thus be obtained.

What is claimed is:

1. A layered polycrystalline structure comprising:
   a seed crystal layer containing a non-magnetic element;
   a magnetic crystal layer containing the non-magnetic element diffused along a grain boundary, said magnetic crystal layer including a lower part partly excluding the non-magnetic element out of a lattice of the magnetic crystal layer and an upper part completely excluding the non-magnetic element out of the lattice of the magnetic crystal layer; and
   a non-magnetic crystal layer interposed between the seed crystal layer and the magnetic crystal layer, said non-magnetic crystal layer containing the non-magnetic element at a first concentration level near the seed crystal layer and at a second concentration level smaller than the first concentration level near the magnetic crystal layer.

2. A layered polycrystalline structure comprising:
   a seed crystal layer containing Cr element at a concentration level equal to or larger than 50 at %;
   a Co-based alloy magnetic crystal layer containing Cr element diffused along a grain boundary, said Co-based alloy magnetic crystal layer including a lower part partly excluding Cr element out of a lattice of the Co-based alloy magnetic crystal layer and an upper part completely excluding Cr element out of the lattice of the Co-based alloy magnetic crystal layer; and
   a Co-based alloy non-magnetic crystal layer interposed between the seed crystal layer and the Co-based alloy magnetic crystal layer, said Co-based alloy non-magnetic crystal layer containing Cr element at a first concentration level near the seed crystal layer and at a second concentration level smaller than the first concentration level near the magnetic crystal layer.

3. The layered polycrystalline structure according to claim 2, wherein said seed crystal layer is a pure Cr layer.

4. A magnetic recording medium comprising:
   a substrate;
   a seed crystal layer formed on a surface of the substrate and containing a non-magnetic element;
   a magnetic crystal layer containing the non-magnetic element diffused along a grain boundary, said magnetic crystal layer including a lower part partly excluding the non-magnetic element out of a lattice of the magnetic crystal layer and an upper part completely excluding the non-magnetic element out of the lattice of the magnetic crystal layer; and
   a non-magnetic crystal layer interposed between the seed crystal layer and the magnetic crystal layer, said non-magnetic crystal layer containing the non-magnetic element at a first concentration level near the seed crystal layer and at a second concentration level smaller than the first concentration level near the magnetic crystal layer.

5. The magnetic recording medium according to claim 4, wherein an amorphous layer is defined along the surface of the substrate.

6. The magnetic recording medium according to claim 4, wherein a Ti layer is defined along the surface of the substrate.

7. The layered polycrystalline structure according to claim 1, wherein the magnetic crystal layer contains grains having sizes equal to corresponding grains in the non-magnetic crystal layer.

8. The layered polycrystalline structure according to claim 1, wherein the non-magnetic crystal layer has an epitaxial relationship to the seed crystal layer, the magnetic crystal layer having an epitaxial relationship to the non-magnetic crystal layer.

9. The layered polycrystalline structure according to claim 1, wherein a concentration of the non-magnetic element has a gradient from the first concentration level near the seed crystal layer to the second concentration level near the magnetic crystal layer.

10. The layered polycrystalline structure according to claim 1, wherein the magnetic crystal layer contains the non-magnetic element at a concentration level equal to the second concentration level along the grain boundary.

11. The layered polycrystalline structure according to claim 1, wherein the part of the magnetic crystal layer is a magnetic grain.

* * * * *